2,793,169

SEPARATING SOLID HYDROCARBONS FROM MIXTURES THEREOF WITH OILS

Hendrik Mondria, Jan Willem Ruwhof, and Eduard Sweep, Amsterdam, Netherlands, assignors to Shell Development Company, Emeryville, Calif., a corporation of Delaware No Drawing. Application November 18, 1952, Serial No. 321,276

Claims priority, application Netherlands November 30, 1951

11 Claims. (Cl. 196—18)

This invention relates to a process for separating solid substances, such as solid hydrocarbons or complex hydrocarbon compounds from mixtures thereof with oils. More particularly, it relates to a process for dewaxing mineral oils or fractions thereof.

It has already been proposed to separate solid hydrocarbons from mixtures thereof with oils, particularly to dewax wax-bearing mineral oils, by admixing the initial mixture with an organic solvent which is a solvent for the oil but a non-solvent for the solid hydrocarbon at operating temperatures, contacting the resulting mixture with an auxiliary liquid which is substantially immiscible therewith and containing a suitable surface-active agent and, if necessary, a demulsifying agent, under such circumstances that the solid hydrocarbon passes into this auxiliary liquid. The oil phase is then separated from the resulting solid hydrocarbon-containing auxiliary liquid, and the solid hydrocarbon is then recovered from the auxiliary liquid phase.

Described in greater detail, this process of separating solid substances, such as wax, from mixtures thereof with oils, particularly hydrocarbon oils, comprises (a) mixing the initial mixture with an organic solvent which is a solvent for the oil but is substantially a non-solvent for the solid substance; (b) commingling the resulting oil-solvent phase containing the solid material dispersed therein with an auxiliary liquid which is substantially immiscible therewith and which has a dielectric constant higher than that of the oil-solvent phase, and with a surface-active agent (preferably an ionic surface-active agent); (c) correlating the dielectric constants of the two liquid phases so that the contact angle in the oil-solvent phase has a value of at least 90°, preferably at least 110°, whereby the solid material is preferentially wetted by the auxiliary liquid phase and thereby is transferred thereto; (d) separating the oil-solvent phase from the resulting solid material-containing auxiliary liquid phase; and (e) recovering the solid material from the auxiliary liquid phase.

The contact angle, generally represented by the symbol $\theta$, is the angle which the interfacial tension of the two liquid phases, represented by $\gamma$, forms with the solid. The system of the surface-active substance and the two liquids is preferably so selected that the absolute value of $\gamma \cos \theta$, which is a measure of the strength that impels the solid material into the auxiliary liquid phase, attains a maximum, which usually occurs when the contact angle in the oil-solvent phase has a value of at least 120° and often of 140–150° or more.

The proper selection of organic solvent, auxiliary liquid and surface-active agent is essential in the above process. Generally, it is necessary that the value of the dielectric constant of the oil-solvent phase be between about 2 and about 15, and preferably between about 3 and about 10.

The above process is particularly applicable to the dewaxing of wax-bearing mineral oils.

In accordance with the present invention, it has now been found that surface-active organic phosphorus compounds, and preferably salts of organic phosphorus acids, are particularly effective for use as the surface-active agent in the above process.

With the use of organic phosphorus compounds as the surface active agent, it has been found that the value of the dielectric constant of the oil-solvent phase is not so critical as with the surface-active agents heretofore used, and therefore, a far greater freedom of operation is possible. Furthermore, with the use of surface-active organic phosphorus compounds, it is even possible to carry out the above-described process without the use of an organic solvent, providing the viscosity of the oil at the operating temperatures is sufficiently low. Most favorable results, however, are obtained when an organic solvent is employed.

The preferred organic phosphorus compounds of the present invention are the alkali metal, and particularly the sodium, salts of organic phosphorus acids, that is, organic phosphates, organic phosphites, phosphonic acids, phosphinic acids, phosphonous acids, and phosphinous acids, particularly organic phosphorus acids in which the organic group(s) is an alkyl aryl group and/or an alkyl group, and which contain at least about 10, and preferably at least about 16 carbon atoms per molecule. It is preferred that the number of carbon atoms per molecule not exceed about 30, and preferably not exceed about 25. The most suitable compounds for use in the present invention are the alkali metal salts of the aryl esters, the alkyl esters, and the mixed alkyl aryl esters, that is, esters containing at least one alkyl group as the esterifying group and at least one aryl group as the esterifying group, of phosphoric acid. Examples of these classes of compounds are the alkali metal salts, particularly the sodium salts, of di-3,5,5-trimethylhexyl phosphate, di-n-octyl phosphate, di-2-n-propylhexyl phosphate, di-2-ethylhexyl phosphate, di-decyl phosphate, di-octylphenyl phosphate, and the like. Other suitable compounds include the alkali metal salts of the phosphated alcohols, the phosphated fatty acids, fluoroalkane-phosphonic acids, alkane phosphinic acids, alkane phosphonic acids, alkylated benzene phosphinic acids, and the like. All of the above compounds are anionic surface-active agents.

Another class of organic phosphorus compounds which are cationic surface-active agents and which are suitable for use in the present invention are the quaternary ammonium salts of esters of phosphoric acid. Examples of this class of compounds are: tetraethylammonium diethyl phosphate, tolyltriethylammonium dicresyl phosphate, ethyldimethylcyclohexylammonium diethyl phosphate, ethyldimethyloctadecylammonium diethyl phosphate, and the like.

The surface-active agent is employed in the range of from about 0.01% to about 5%, preferably from about 0.02% to about 2%, by weight, based on the auxiliary liquid.

The method of separating solid hydrocarbons from mixtures thereof with oils according to the above-outlined process is described in detail with particular reference to the dewaxing of waxy mineral oils in the copending application of Mondria et al., Serial No. 262,438, filed December 19, 1951, and will be discussed only briefly here, also with particular reference to the dewaxing of waxy mineral oils.

If an organic solvent is employed, this organic solvent should be a good dewaxing solvent, that is, it should be a good solvent for oil, but substantially a non-solvent for solid wax. Suitable dewaxing solvents include halogenated hydrocarbons such as ethylene dichloride, ethylene dibromide, chloroform, carbon tetrachloride, ethyl chloride, propyl chloride, ethyl bromide, propyl bromide, trichloroethane, tetrachloroethane, propylene chloride, trimethylene chloride, amyl bromide, tertiary amyl chloride, butyl chloride, butyl bromide, allyl bromide, beta, beta'-dichlorodiethyl ether, chlorobenzene, bromobenzene, o-dichloro-benzene, tetrachloroethylene, tetrafluoroethylene, 2-chlorophenyl amine, 3-chlorophenylamine, and 1-amino-2-fluorobenzene; aliphatic and aromatic hydrocarbons such as petroleum ether, petroleum naphtha, gasoline, pentane, isopentane, hexane, heptane, octane, benzene, propylbenzene, cumene, amylbenzene, toluene, xylene, and cymene; ketones, such as methyl isopropyl ketone, methyl isobutyl ketone, methyl ethyl ketone, and mixtures thereof with hydrocarbons such as benzene and/or toluene; and other compounds such as nitrobenzene, furfural, aniline, toluidine, o-aminoethylbenzene, m-aminoethylbenzene, N-methylaniline, N-ethyl-phenylamine, p-methoxy-aniline, 1-ethoxybutane, and methyl phenyl ether as well as various mixtures thereof, and with other solvents.

The solvent is employed in the ratio of from about 3 to about 10 parts by weight of solvent to 1 part of oil.

The auxiliary liquid employed should have a higher dielectric constant than the oil-solvent phase and should be substantially immiscible therewith. In general, the auxiliary liquid should be strongly polar in character. Water, or an aqueous liquid is, therefore, preferred. As a rule, at least 50% of the auxiliary liquid consists of water. Lower alcohols, glycol or glycerol can be used alone as the auxiliary liquid, but combinations thereof with water are generally preferred. In order to lower the freezing point of water, salts, such as NaCl or CaCl₂, or alcohols, such as methyl or ethyl alcohol or ethylene glycol, can be added. The amount of auxiliary liquid employed should be sufficient to enable it to readily absorb the wax particles. The volume ratio of auxiliary liquid to oil-solvent phase should be at least 1:1, preferably in the range of from about 1:1 to about 3:1.

It is preferred that the auxiliary liquid phase have a pH value of greater than 7 since the contact angle increases as the pH of the auxiliary liquid phase increases. Furthermore, a pH of greater than 7 promotes the formation of the more desirable oil-in-water emulsion (which is temporary) rather than a water-in-oil emulsion. The pH value of the auxiliary liquid phase can be adjusted, for example, by the addition of a minor amount of a basic substance such as an aqueous sodium hydroxide solution.

Owing to the presence of the surface-active agent, the various interfacial tensions have become so small that the formation of emulsions can be expected in many cases. The formation of emulsions is in itself not a disadvantage as it causes intimate contact between the water and oil phases. For the subsequent separation of the solid wax and the separation of the liquid phases from each other it is, however, necessary that no stable emulsions be formed. It has been found that the addition of a demulsifier will prevent the formation of persistent emulsions without harming the activity of the surface-active agent. The demulsifier used must not, of course, precipitate the surface-active agent.

When using an anionic surface-active agent, cationic demulsifiers are generally used. Suitable cationic demulsifiers are salts of polyvalent metals, preferably divalent metals, e. g., $MgSO_4$, $MgCl_2$, $CaCl_2$, $Ni(NO_3)_2$, $Zn(NO_3)_2$, $FeSO_4$, $CuSO_4$, $CdCl_2$ and $MnSO_4$. Certain monovalent metal salts, such as the lithium and ammonium salts can be used, for example, LiCl and $NH_4Cl$.

When using a cationic surface-active agent, an anionic demulsifier should be used. Preferred anionic demulsifiers are salts of monovalent cations and polyvalent anions, such as $Na_2SO_3$, $K_2CrO_4$, $Na_4P_2O_7$, $Na_2SO_4$, $Na_2CO_3$, $K_2CO_3$, $K_2S$ and $Na_2S_2O_3$.

Organic demulsifiers produce no results by themselves, but are active when used together with an inorganic salt such as sodium sulfate. Suitable organic demulsifiers include cyclohexylamine, phenol, diphenylamine, amyl alcohol, dodecyl alcohol and cyclohexanol. Non-ionic surface-active agents are also active as demulsifiers when used with an inorganic salt such as sodium sulfate. Representative non-ionic surface-active agents include esters and ethers of polyhydroxy alcohols, particularly polyglycols, e. g., the monostearate and monooleate of polyethylene glycol, polyoxyethylene derivatives of alkyl phenols, and polyoxyethylene derivatives of sorbitol esters of fatty acids.

The demulsifier is employed in the range of about 0.0005% to about 1% by weight, based on the auxiliary liquid.

The suspension of the solid material in the oil phase, if desired, in admixture with a suitable solvent, can be brought into intimate contact with the auxiliary phase by allowing the finely dispersed auxiliary phase to pass as droplets through the slurry, or the finely dispersed slurry through the auxiliary liquid phase. The latter method is to be preferred. This method of contacting can be accomplished by introducing the auxiliary liquid phase at the bottom of a column (in the event that the auxiliary phase is the light and the suspension the heavy phase), introducing the suspension via a distributor to the column at a point above the interface between the oil phase and auxiliary liquid phase (which interface is present at the bottom of the column), and discharging the resulting solid-containing auxiliary liquid phase from the top and the oil phase from the bottom of the column.

The following examples serve to illustrate the process of the present invention and the advantages thereof.

*Example I*

Four hundred parts by weight of ethylene dichloride were added, at a temperature of 70° C., to 100 parts by weight of a mineral oil distillate which at −18° C. contained 20% by weight of solid wax. The mixture was slowly cooled, with moderate stirring, to a temperature of −18° C. in order to solidify the wax. The resulting slurry was contacted with an auxiliary phase, which was maintained at a temperature of −18° C., and which consisted of 600 parts by weight of water and 333 parts by weight of ethylene glycol. The auxiliary liquid phase contained dissolved therein 0.466 part by weight of sodium di-3,5,5-trimethylhexyl phosphate as the surface-active agent, and a mixture of 2.66 parts by weight of $Na_2SO_4$, 1.33 parts by weight of cyclohexanol and 0.466 part by weight of Triton X 770 which is a polyethylene oxide derivative of an alkylaryl sulfonate, as the demulsifying agent. The auxiliary liquid phase was rendered weakly alkaline by the addition of NaOH. After settling the resulting mixture for about 5 minutes at −18° C., while stirring very gently, the aqueous phase containing solid wax was separated from the oil-solvent phase. The ethylene dichloride was removed from the oil by distillation. The oil yield amounted to 79%, so that only 1% of oil was entrained with the separated wax. The cloud point of the oil was −15° C.

*Example II*

A mineral oil distillate containing paraffin wax (60% solid paraffin wax at 15° C., density $d_4^{70}=0.8053$, boiling range at atmospheric pressure of 396° to 437° C., pour point of 53° C., viscosity at 60° C. Redwood I of 53.2) was mixed with a solvent consisting of benzene and methyl ethyl ketone (MEK). The ratio of benzene to MEK was varied as shown in Table I below. The oil-solvent mixture was cooled to 15° C. to solidify the wax. Fifty liters of water containing 50 grams of sodium di-3,5,5-trimethylhexyl phosphate as the surface-active agent, and 400 grams of NaOH and 400 grams of $Na_2SO_4$ to prevent emulsion difficulties, was added to 50 liters of the oil-solvent mixture. The value of the contact angle at each of the different MEK to benzene ratios is given in Table I. For purposes of comparison, two similar tests were carried out, one employing 100 grams of sodium heptadecyl-9 sulfate as the surface-active agent, and the other employing 250 grams of sodium dodecyl benzene sulfonate (propylene tetramer) as the surface-active agent and 5000 grams of NaCl to prevent emulsion difficulties. The results of the tests are given in Table I.

TABLE I

| MEK/benzene Ratio | Contact Angle with Na di-3,5,5-trimethyl-hexyl phosphate | Contact Angle with Na heptadecyl-9 sulfate | Contact Angle with Na dodecyl-benzene sulfonate |
|---|---|---|---|
| | Degrees | Degrees | Degrees |
| 100/0 | | | 16 |
| 80/20 | | | 64 |
| 60/40 | 100 | 76 | 90 |
| 50/50 | 110 | 88 | |
| 40/60 | 140 | 115 | 67 |
| 30/70 | 159 | 157 | |
| 20/80 | 153 | 130 | 42 |
| 10/90 | 141 | 90 | |
| 5/95 | 135 | 78 | |
| 0/100 | 130 | | 22 |

The solid wax merged into the auxiliary phase only in those cases in which the contact angle was greater than 90°. From the above results it can be seen that the polarity, that is, the value of the dielectric constant, of the oil-solvent phase is far less critical when the organic phosphorus is employed as the surface-active agent than when either the sodium heptadecyl-9 sulfate or the sodium dodecyl benzene sulfonate is employed, and, therefore, a far greater amount of freedom in the selection of the dewaxing solvent is possible when using the surface-active organic phosphorus compound.

It also follows from the above results that the use of a polar solvent such as MEK is not absolutely necessary since when using benzene (which is substantially non-polar) alone, the contact angle is still above 90°. It could also be expected from the above results that the process of the present invention could be carried out without the use of a dewaxing solvent, provided that the viscosity of the oil phase at dewaxing temperatures is sufficiently low. This is illustrated by the following example.

*Example III*

(a) One hundred parts by weight of a waxy mineral oil distillate were heated to a temperature of about 70° C. and then cooled, with moderate stirring, to 30° C. whereby 7 parts by weight of solid wax crystallized out. The resulting slurry was then admixed with 400 parts by weight of water which was at a temperature of 30° C. and which contained 0.4 part by weight of sodium di-3,5,5-trimethylhexyl phosphate as surface-active agent and 2 parts by weight of $Na_2SO_4$ as demulsifier. The auxiliary liquid phase had been rendered weakly alkaline. After the mixture had settled at 30° C. for about 20 minutes, the aqueous phase containing the solid wax was separated from the oil phase. The wax-containing aqueous phase was heated to 70° C., to melt the wax. The liquid wax was separated from the aqueous liquid. The separated wax contained 12.9% by weight of oil (ASTM Method D 721) and had a melting point of 57° C.

(b) The oil phase separated off under (a) was slowly cooled further to 20° C., with moderate stirring, whereby 7.25 parts by weight of solid wax crystallized out. The resulting slurry was treated in a manner similar to that described under (a) with 400 parts by weight of water which was at a temperature of 20° C. and which contained 0.4 part by weight of sodium di-3,5,5-trimethylhexyl phosphate, as the surface-active agent, and a mixture of 0.13 part by weight of Triton X 770, 2 parts by weight of NaOH and 2 parts by weight of $Na_2SO_4$ to promote the separation of the phases. The resulting wax which was separated in the same manner as described in (a) above, contained 5.47% by weight of oil (ASTM Method D 721) and had a melting point of 53.5° C.

From the results, it can be seen that it is possible to obtain a transfer of solid wax to the auxiliary liquid in the absence of a dewaxing solvent by employing a surface-active organic compound of phosphorus according to the present invention, but that more favorable results are obtained in the presence of a dewaxing solvent.

Prior to the recovery of wax from the wax-containing aqueous phase, it is preferred to wash the wax-containing aqueous phase with dewaxing solvent as described in detail in the aforementioned copending application of Mondria et al. This embodiment of the invention is illustrated by the following example.

*Example IV*

(a) One hundred parts by weight of a waxy mineral oil distillate were diluted at 70° C. with 300 parts by weight of ethylene dichloride. The mixture was cooled slowly, with moderate stirring, to 22° C. in order to crystallize out solid wax. The resulting slurry was contacted with 400 parts by weight of water which was at a temperature of 22° C. and which contained 0.2 part by weight of sodium di-n-octyl phosphate, 2.4 parts by weight of NaOH to render the aqueous phase slightly alkaline, and 2.4 parts by weight of $Na_2SO_4$ as demulsifier. After settling for 1 or 2 minutes at 22° C., while stirring very gently, the aqueous phase containing solid wax was separated from the oil-solvent phase. The wax-containing aqueous phase was heated to 70° C. to melt the wax, and the molten wax was separated from the aqueous phase. The wax thus obtained contained 2.61% by weight of oil (ASTM Method D 721) and had a melting point of 60° C.

(b) A wax-containing aqueous phase obtained in the same manner described in Example IV (a) was stirred with 400 parts by weight of ethylene dichloride. After settling for about 1½ minutes at 22° C., while stirring very gently, the aqueous phase containing the wax was separated from the ethylene dichloride phase. The wax-containing water phase was heated to 70° C. to melt the wax which was then removed. The recovered wax contained only 0.22% by weight of oil and had a melting point of 60.5° C.

(c) A wax-containing aqueous phase washed with ethylene dichloride, and obtained in the same manner as described in Example IV (a) and (b), was filtered to remove a substantial amount of the aqueous liquid. The wax cake obtained was heated to 70° C. and the liquefied wax was separated from the remaining aqueous liquid. The wax thus obtained contained only 0.04% by weight of oil and had a melting point of 61° C.

Although the invention has been described in detail with reference to the dewaxing of waxy oils, it is also applicable to the separation of solid naphthalene from tar oil and for removing complex hydrocarbon compounds from their reaction medium. Such complex hydrocarbon compounds include the urea-straight chain hydrocarbon complexes, and the complexes of thiourea and branched chain and/or naphthenic hydrocarbons. The formation of such complexes is used to separate mixtures of hydrocarbons as described in U. S. Patents 2,499,820; 2,520,715; 2,520,716; 2,549,372; 2,578,054; and 2,569,986. The crystalline complexes are preferably transferred to the auxiliary liquid phase which in this case is generally an aqueous or an aqueous-alcoholic solution of urea or thiourea.

We claim as our invention:

1. In a method of dewaxing a waxy mineral oil, the combination of steps comprising: (1) mixing the waxy mineral oil with a substantial proportion of a dewaxing solvent which is a solvent for the mineral oil but which is substantially a non-solvent for solid wax, and adjusting the temperature of the mixture to obtain a single liquid phase of the solvent, oil and wax; (2) cooling the mixture to a dewaxing temperature at which the wax solidifies, thereby forming a dispersion of solid wax particles in a liquid oil phase which is a solution of the oil and the solvent; (3) intimately mixing the resulting dispersion of solid wax dispersed in the oil phase with a substantial proportion, at least equal in volume to the volume of the oil phase, of a substantially polar auxiliary liquid which is substantially immiscible therewith and which has a dielectric constant higher than that of the oil phase, the auxiliary liquid being essentially at the dewaxing temperature, and with a minor amount of a surface-active organic phosphorus compound, whereby two liquid phases result, an oil phase consisting essentially of mineral oil and solvent and an auxiliary liquid phase containing dissolved said phosphorus compound, and correlating the dielectric constants of the two liquid phases so that the contact angle in the oil phase is at least 90°, whereby the solid wax is preferentially wetted by the auxiliary liquid phase and is transferred thereto to produce a dispersion of the solid wax in the auxiliary liquid phase as continuous phase, while the oil phase is substantially freed from solid wax; (4) stratifying and separating the oil phase from the auxiliary liquid phase containing the dispersion of solid wax; and (5) separating the wax from the auxiliary liquid phase.

2. The method according to claim 1, wherein the auxiliary liquid is a substantially aqueous liquid.

3. The method according to claim 2, wherein the organic phosphorus compound is a salt of an organic phosphate.

4. The method according to claim 2, wherein the organic phosphorus compound is an alkali metal salt of a dialkyl phosphate.

5. The method according to claim 2, wherein the organic phosphorus compound is an alkali metal salt of a dialkyl phosphate which contains at least 10 carbon atoms per molecule.

6. The method according to claim 2, wherein the organic phosphorus compound is an alkali metal salt of a dialkyl phosphate which contains at least 16 carbon atoms per molecule.

7. The method according to claim 2, wherein the organic phosphorus compound is an alkali metal salt of di-3,5,5-trimethylhexyl phosphate.

8. The method according to claim 2, wherein the organic phosphorus compound is an alkali metal salt of di-n-octyl phosphate.

9. The method according to claim 2, wherein the dewaxing solvent is from about 3 to about 10 parts by weight, based on the mineral oil, of ethylene dichloride, and wherein the organic phosphorus compound is from about 0.01% to about 5% by weight, based on the aqueous liquid, of an alkali metal salt of a dialkyl phosphate which contains at least 16 carbon atoms per molecule.

10. The method according to claim 9, wherein the alkali metal salt of the dialkyl phosphate is sodium di-3,5,5-trimethylhexyl phosphate.

11. The method according to claim 9, wherein the alkali metal salt of the dialkyl phosphate is sodium di-n-octyl phosphate.

References Cited in the file of this patent

UNITED STATES PATENTS

| | | |
|---|---|---|
| 2,005,619 | Graves | June 18, 1935 |
| 2,563,506 | Werntz | Aug. 7, 1951 |
| 2,645,598 | Myers et al. | July 14, 1953 |
| 2,698,279 | Mondria | Dec. 28, 1954 |